INVENTOR.

United States Patent Office 3,544,294
Patented Dec. 1, 1970

3,544,294
METHOD FOR MANUFACTURING LAMINATED GLASS PLATES
Eizo Goto, Chigasaki-shi, Japan, assignor to Tokyo Shibaura Electric Co., Ltd., Kawasaki-shi, Japan, a corporation of Japan
Filed Oct. 5, 1967, Ser. No. 673,030
Claims priority, application Japan, Oct. 8, 1966, 41/66,218
Int. Cl. C03c 27/12; B32b 17/00
U.S. Cl. 65—40       2 Claims

ABSTRACT OF THE DISCLOSURE

A method of manufacturing laminated glass plates wherein glass plates are placed parallel to each other leaving a space between them. A metal spacer is inserted between the glass plates along their circumferential edges. The circumferential edges are then immersed in a molten glass bath having a viscosity sufficient to allow the molten glass to fill in the spaces between the glass plates and the spacer, to thus act as a bonding agent. An electric current is passed between the meter spacer and electrodes immersed in the molten glass bath. Then the immersed circumferential edges are withdrawn from the bath.

---

The present invention relates to a method for manufacturing laminated glass plates which comprises hermetically sealing the circumferential edges of a plurality of laminated glass plates spaced from each other by means of a spacer.

The laminated glass plates have spaces between them shut off from the atmosphere in order to insulate heat or obstruct sounds or to prevent the droplets of water or oil from being condensed on the inner surface of the glass plates, so that due to these characteristics they find wide general applications in the windows of buildings, vehicles, show cases, ice boxes, etc.

The prior art process of manufacturing such laminated glass plates consisted in spraying molten metal on the surface of the mutually facing circumferential edges of a plurality of glass plates laminated with a space between them, forming layer of brazing metal on the sprayed molten metal, clamping metal spacers between the layers of brazing metal and brazing these metal members together by high frequency heating.

With the prior art process, however, it was impossible completely to shut off the space between the laminated glass plates from the atmosphere. The reason is that since the melting point of the aforementioned brazing agent is far higher than that of glass, it is required to reduce the brazing temperature as much as possible in order to prevent the melting of glass due to such brazing.

However, if the brazing temperature is lowered beyond certain limits, adhesion of the brazing agent to the spacers and a sprayed thin metal film will not be fully effected, with the resultant occurrence of pin holes in the joints of the spacers, brazing agent and this metal film. Consequently the laminated glass plates manufactured by the previous method had the drawbacks that it was not effective to insulate heat, obstruct sounds and prevent water droplets from being condensed on the inner surface of the glass plates, thus often proving unsatisfactory for practical purposes. The prior art process had further disadvantages that when metal spacers were brazed to the layers of brazing metal, deposition of flux vapours on the inner surface of the glass plates and other causes reduced their transparency. Furthermore, the processes of spraying molten metal and brazing spacers were complicated, time-consuming and inefficient and required large and costly equipment due to the necessity of carrying out high frequency heating.

It is accordingly an object of the present invention to provide a method of completely sealing the circumferential edges of a plurality of glass plates laminated with a space between them to make the space perfectly free from the intrusion of the atmosphere.

A second object of the present invention is to offer a process of eliminating the evolution of vapours which will deposit on the inner surface of the glass plates while their circumferential edges are being sealed.

Another object of the present invention is to make available a device which will carry out an efficient manufacturing operation with a brief series of easy steps and require only simple and inexpensive equipment.

The present invention represents a process of inserting spacers between the circumferential edges of a plurality of glass plates laminated with a space between them, immersing the circumferential edges in a molten glass bath, preferably a molten glass bath through which an electric current is introduced and solidifying the glass deposited thereon after removal from the bath.

Figure 1:
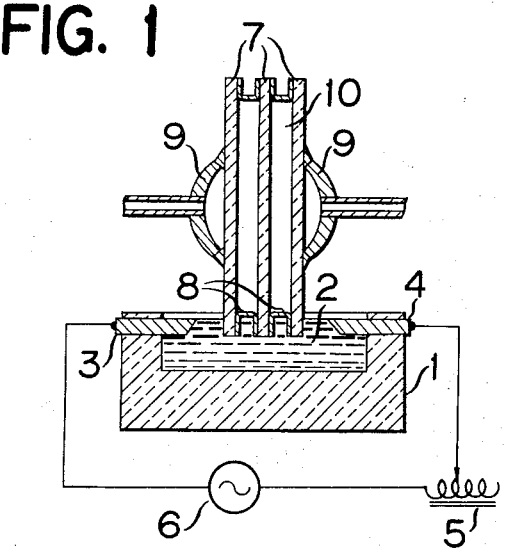
FIG. 1 is a longitudinal section of the laminated glass plates according to one embodiment of the present invention.

One embodiment of the present invention will now be described by reference to FIG. 1. A boat-like furnace 1 elongated in a direction vertical to the plane of the paper of the drawing has a pair of electrodes 3 and 4 fitted to both opposed lengthwise walls in such a manner that they are disposed at the top of a molten glass bath 2 contained in the furnace 1. The electrodes are connected through a ballast 5 to an AC power source 6. The current from this source flows through the molten glass bath 2 from the electrode 3 to the electrode 4 and to 5. The glass heated by the Joule heat at this time is always kept in a molten state. A plurality of glass plates 7 are spaced from each other. The glass plates 7 are clamped by vacuum chucks 9 in the central part of both sides of the glass plate assembly.

Figures 2A, 2B, 2C:
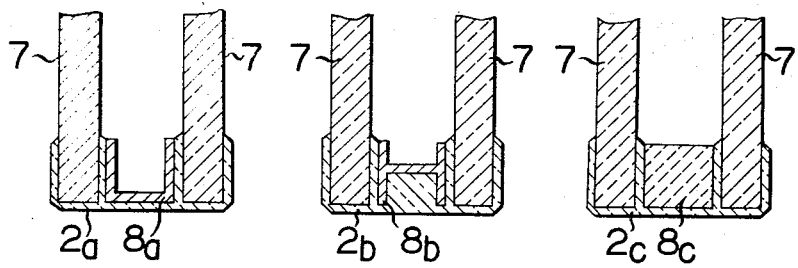
FIGS. 2a, 2b and 2c represent the same type of laminated glass plates fabricated using various forms of spacers.

The spacer 8 may consist of a metal member 8a having a U-shaped cross section (see FIG. 2a), an H-shaped metal member 8b (see FIG. 2b), or a rectangular member 8c made of glass or ceramic material (see FIG. 2c).

The glass contained in the furnace 1 is easily melted by power supplied from the AC source 6. The viscosity distribution of the molten glass bath 2 from the free surface to a certain depth is kept in a favourable state for the fusing operation.

Only when the circumferential edges of the glass plates 7 clamped by the vacuum chucks 9 are immersed in the molten glass bath 2 along with the spacers, power supply from the AC source 6 to the electrodes 3 and 4 is cut off. The glass plates are preheated beyond 400° C. before being immersed in the molten glass bath 2 so as to improve wetting by the molten glass. If the temperature of the preheated glass plates is below 400° C., wetting of the glass plates 7 by the molten glass will not be carried out to a sufficient extent to attain the object of the present invention. Consequently the preheating temperatures of the glass plates exceed beyond 400° C. When the glass plates 7 are immersed in the molten glass bath 2, molten glass is fused to the circumferential edges thereof. When the glass plates are removed from the molten glass bath in as short a time as one or two seconds after immersion, the molten glass filled into the spaces between the glass plates and the spacers 8a, 8b and 8c, as illustrated in FIGS. 2a, 2b and 2c, solidifies to seal those spaces. Where the glass plate is circular in shape, one rotation of the vacuum chucks around the arm will ensure the sealing of all the circumferential edges of the glass plates. However, if the glass plates have an angular form such as a rectangle or square, one side of the glass plates is first sealed in the aforementioned manner, and then the other sides are immersed in turn by rotation for sealing in the molten glass bath 2 by lifting and partially rotating the vacuum chucks 9, thereby to complete the sealing of all the sides of the glass plates 7.

Since the present invention consists in fusing molten glass integrally to the glass plates 7, the resultant attachment between these two parts of glass is firm and strong, so that there is no possibility of pin holes being formed on the contact surface between the glass plates and the spacers 8, nor there is any occurrence of vapours from the molten glass which might cloud the inner surface of the glass plates 7. According to the present invention, therefore, there is no likelihood that there will be produced unsatisfactory opaque laminated glass plates as has often been the case with the prior art process.

If, in the aforementioned embodiment, an electric current is kept introduced through the molten glass bath 2 while the glass plates 7 are immersed therein, the surface of the edges rises in temperature by absorbing heat from the molten glass bath 2 to become conductive. When an electric current flows to the surface of the circumferential edges of the glass plates 7, part of the molten glass bath 2 is instantly fused with the surface.

When the glass plates 7 to which molten glass has been attached is drawn out of the glass bath 2, the molten glass which has filled up the spaces between the glass plates 7 and the spacers 8a, 8b or 8c, solidifies tightly to seal the interstices.

The solidified glass portions 2a, 2b and 2c are actually integrally fused with the glass plates 7, so that the border lines between them do not appear so distinctly as illustrated in FIGS. 2a, 2b and 2c. Therefore they are presented only by way of convenience, showing the border lines purposely clearly and denoting the solidified glass portions 2a, 2b and 2c and the glass plates respectively by different forms of hatching.

The spaces within a plurality of laminated glass plates sealed in the manner as described above should be filled with dry gas at an approximately atmospheric pressure so as to prevent the inner surfaces of the laminated glass plates 7 from being clouded in use and also the glass plates from being strained and consequently damaged due to differential pressures existing within and without said spaces. For this purpose, the step of immersing the laminated glass plates in a molten glass bath, as involved in the process of the present invention, may be carried out in an atmosphere conditioned in advance for inclusion in the spaces between the laimnated glass plates. Describing further in detail, gases which will not be condensed due to temeprature variations, such as dry air, nitrogen, and argon may be used as the atmosphere in which the laminated glass plates are immersed in a molten glass bath, after being heated to about 530° C. and pressurised to about 1700 mm. Hg. When immersion and removal of the glass plate, assembly are carried out in such atmosphere according to the aforementioned procedures, the finished sealed laminated glass plates will be filled with dry gas having a pressure of about 600 mm. Hg at normal temperature.

As will be seen from the foregoing description, the apparatus and steps involved in the process of the present invention are easy and simple, and moreover enable the finished laminated glass plates to have a very strong and reliable sealed construction.

Description will now be given of the main materials and factors thereof involved in the aforementioned embodiment: The glass plate 7 consisting of a plate of soda lime glass 3 mm. thick (thermal expansion coefficient $92 \times 10^{-7}/°$ C.; softening point 696° C.), the spacer 8, a U-shaped plate of nickel-iron-chrome alloy having a cross sectional area 6 x 6 x 6 mm. (thermal expansion coefficient $99 \times 10^{-7}/°$ C.); a molten glass bath 2, low melting glass (thermal expansion coefficient $98 \times 10^{-7}/°$ C., softening point 510° C.), and the electrodes 3 and 4 are of molybdenum. The process according to said embodiment was carried out by introducing an electric current of about 4 amperes per centimetre of the electrode width and maintaining the viscosity of the top section of the molten glass bath 2 at a level of 100 poises or less. In this case, the atmosphere surrounding the molten glass bath consisted of dry air at a pressure of 1700 mm. Hg. The interior space of the airtight laminated glass plates thus fabricated was filled with dry air at a pressure of 600 mm. Hg at normal temperature.

Figure 3:
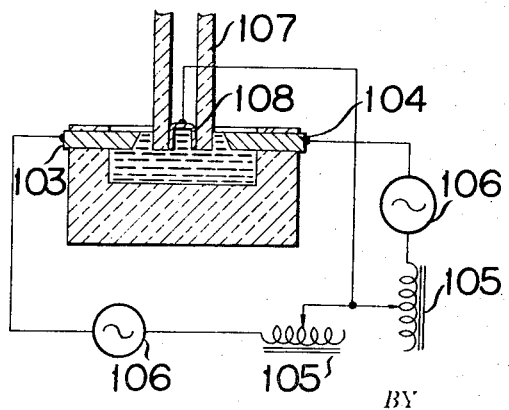
FIG. 3 is a longitudinal section of the laminated glass plates according to another embodiment of the invention.

Next there will be described the differences between the foregoing embodiment and another embodiment of FIG. 3.

Use is made of the glass plate consisting of a plate of soda lime glass 3 mm. thick (thermal expansion coefficient: $92 \times 10^{-7}/°$ C., softening point 696° C.); a spacer 108, a U-shaped plate of nickel-iron-chrome alloy 0.5 mm. thick (thermal expansion coefficient: $99 \times 10^{-7}/°$ C.) having a cross sectional area 6 x 6 x 6 m./m.; a molten glass bath, a low melting glass (thermal expansion coefficient: $98 \times 10^{-7}/°$ C., softening point 510° C.); and electrodes 103, 104 made of molybdenum. The process according to another embodiment is carried out by passing an electric current of about 4 amperes per centimetre of the electrode width and maintaining the viscosity of the surface portion of the molten glass bath at a level of 100 poises or less. An AC power source 106 is connected to a ballast 105 through electrodes 103, 104 and the spacer 108, and one side of the peripheral portions of the glass plates 107 is immersed with the spacer 108 disposed therebetween. The same processes are also repeated on the other three sides thereof. When dry air and inert gas are filled within the airtight space defined by glass plates, airtight laminated glass plates are completed.

I claim:
1. A method for manufacturing laminated glass plates wherein a plurality of glass plates are placed parallel to each other leaving a space between them, comprising the steps of inserting a metal spacer between the parallel glass plates along the circumferential edges thereof, immersing the circumferential edges thereof in a molten glass bath having a viscosity sufficient to accomplish adherence of the molten glass to the parts to be sealed, thus filling the molten glass as a bonding agent into the spaces between the glass plates and spacer, passing at the same time an electric current between the metal spacer and electrodes immersed outside of the glass plates in an upper zone of the molten glass bath for a sufficient time to allow adherence of the molten glass to the parts to be bonded, and withdrawing the immersed circumferential edges.

2. A method for manufacturing laminated glass plates according to claim 1, wherein the steps of immersing the circumferential edges of the parallel glass plates and withdrawing the immersed circumferential edges are carried out by vacuum chucks fixed to the outer sides of the glass plates.

References Cited

UNITED STATES PATENTS

| | | | |
|---|---|---|---|
| 2,235,680 | 3/1941 | Haven et al. | 65—43 XR |
| 2,708,774 | 5/1955 | Seelen | 65—43 XR |

OTHER REFERENCES

U.S. application Ser. No. 616,390.
U.S. application Ser. No. 618,611.

S. LEON BASHORE, Primary Examiner

S. R. FRIEDMAN, Assistant Examiner

U.S. Cl. X.R.

65—43, 58, 59; 161—192, 196